United States Patent Office 3,525,688
Patented Aug. 25, 1970

3,525,688
DRILLING FLUIDS
Billy L. Swanson, Bartlesville, Okla., assignor to Phillips Petroleum Company, a corporation of Delaware
No Drawing. Filed May 8, 1967, Ser. No. 636,653
Int. Cl. C10m 3/22
U.S. Cl. 252—8.5   10 Claims

ABSTRACT OF THE DISCLOSURE

A water base drilling fluid having incorporated therein a polyethylene glycol having a molecular weight in the range of from 9,000 to 200,000 in an amount sufficient to reduce water loss due to filtration through the filter cake on the well bore.

---

This invention relates to water based drilling fluids. In one aspect the invention relates to controlling the rheological properties of water base drilling muds. In another aspect the invention relates to a method of drilling a well utilizing water base drilling fluids.

In the art of drilling wells, especially that of drilling wells by the rotary method, it is necessary to use a drilling fluid or drilling mud. The drilling mud lubricates the drill stem, cools the stem and drill bit and carries the cuttings from the drilling operation out of the bore hole to the surface. To carry the cuttings to the surface, the drilling fluid must have a viscosity which is low enough so that it can be readily pumped and yet high enough that it can suspend cuttings from the drilling operation therein and prevent their settling while the fluid is being passed from the hole.

The drilling fluid performs the additional function of providing a filter cake on the walls of the bore hole to at least partially prevent the loss of fluid, particularly water, from the drilling fluid into any porous formations adjacent the bore hole. If such water loss were not prevented, there would result a thick filter cake adjacent the porous formations encountered during the drilling operation which would tend to bind the rotating drill string and to prevent circulation of drilling fluid through the well. Excessive water loss also results in the intrusion of water and mud into adjacent oil sands thereby driving back the oil from the bore hole and causing the porosity of the oil sand to be reduced to such an extent that the oil flow from the sand into the bore hole is reduced or prevented.

To perform its important functions properly, the drilling mud must have suitable rheological characteristics including viscosity, yield point, initial gel strength and final gel strength in spite of adverse conditions encountered in well drilling. In some instances, it is necessary to reduce water loss without changing the viscosity of the drilling mud. The invention provides a drilling mud containing a water loss control agent which does not appreciably effect the viscosity of the mud.

Accordingly, it is an object of the invention to provide an improved drilling fluid.

Another object is to provide an improved method of drilling a well.

Another object of the invention is to control the rheological properties of drilling fluids.

Other objects and advantages will be apparent to one skilled in the art upon consideration of the following disclosure and appended claims.

According to the invention, there is provided a drilling fluid comprising sufficient clayey material to form a filter cake on the wall of a well bore, sufficient water to maintain the clayey material as a fluid and a polyethylene glycol having a molecular weight in the range of about 9,000 to 200,000 in an amount sufficient to reduce water loss through the filter cake without increasing the viscosity of the drilling fluid to such an extent that it cannot be circulated.

Polyethylene glycol may be characterized by the formula $H(CH_2CH_2O)_nOH$ wherein $n$ may vary from 200 to 5,000. The polyethylene glycols of the invention can be the products of an ethylene oxide polymerization reaction or the products of ethylene glycol polymerization. The amount of the polyethylene glycol added according to the invention is in the range of 1 to 15 pounds per barrel of drilling fluid, preferably 3 to 10 pounds of polyethylene glycol per barrel of fluid.

In utilizing the drilling fluid of the invention, a well is drilled by rotating a hollow drill stem having a drill bit attached thereto to form a bore hole and the drilling fluid is circulated down through the drill stem and out the bit and then upwardly to deposit a filter cake on the walls of the bore hole and carry cuttings to the surface.

By the practice of the invention water loss rates are reduced by at least a factor of 2. The viscosity of the drilling mud of the invention is substantially unchanged from that of a conventional fresh water mud and the pH is not appreciably different.

EXAMPLE

Polyethylene gylcols of various molecular weights were added to samples of a base mud consisting of a 7 lb. per barrel Texas bentonite clay in fresh water and stirred in a Multimixer stirrer for 20 minutes prior to testing. Plastic viscosity and yield point were obtained by the method of "API Recommended Practice, Standard Procedures for Testing Drilling Fluids," API RP 13B, First Edition, November 1962, Section 2, with a model 35 Fann V-G meter (a direct indicating viscosimeter). The pH of each sample was determined. Water loss was determined according to the method of Section 3 of the same reference. The values are presented in Table I.

TABLE I

| Material | Polyethylene glycol added (lb./bbl.) | PV [2]/YP [3] | pH | WL [4] |
|---|---|---|---|---|
| Base mud | | 1/0 | 9.1 | 36.5 |
| Polyethylene glycol 1,000 [1] | 6.0 | 1/1 | 9.7 | 31.5 |
| Polyethylene glycol 9,000 [1] | 6.0 | 1/1 | 9.3 | 17.4 |
| Polyethylene glycol 20,000 [1] | 6.0 | 1/1 | 9.2 | 14.4 |
| Polyethylene glycol 20,000 [1] | 10.0 | 2/1 | 9.3 | 11.2 |
| Polyethylene glycol 200,000 [1] | 6.0 | 3/0 | 9.2 | 5.5 |
| Polyethylene glycol 600,000 [1] | 6.0 | 6/0 | 9.2 | 5.5 |

[1] Indicates approximate molecular weight.
[2] PV—Plastic viscosity, cp.
[3] YP—Yield point, lb./100 sq. ft.
[4] WL—API room temperature water loss, ml./30 minutes.

This data shows that polyethylene glycols having molecular weight of 9,000 and greater are effective water loss control agents and that they do not significantly increase the viscosity or pH of the drilling fluid. The data also show that polyethylene glycols having a molecular weight above 200,000 do not have an increased effectiveness as water loss control agents and begin to adversely affect the viscosity of the drilling fluid.

Reasonable modification and variation are possible within the scope of this invention which sets forth a novel drilling fluid and method of using the same.

That which is claimed is:

1. A water base drilling mud comprising in combination:
   sufficient water to maintain the mud as a fluid;
   sufficient clayey material to form a filter cake on the wall of a well; and
   a polyethylene glycol having a molecular weight in the range of from 9,000 to 200,000 in an amount sufficient to reduce water loss due to filtration through said filter cake without increasing the viscosity of said driling mud to such an extent that it cannot be circulated.

2. The drilling mud of claim 1 wherein said amount is in the range of 3 to 10 pounds per barrel of said mud.

3. The drilling mud of claim 1 wherein said water is fresh water.

4. The drilling mud of claim 1 wherein said amount is in the range of 1 to 15 pounds per barrel of said mud.

5. The drilling mud of claim 4 wherein said water is fresh water.

6. In a method of drilling wells comprising the steps of drilling said well with well drilling tools and circulating through the well during said drilling a water base drilling mud which forms a filter cake on the wall of said well, the improvement comprising incorporating in said drilling mud a polyethylene glycol having a molecular weight in the range of from 9,000 to 200,000 in an amount sufficient to reduce water loss due to filtration through said filter cake without increasing the viscosity of said drilling mud to the extent that it cannot be circulated.

7. The method of claim 6 wherein said drilling mud is a fresh water mud.

8. The method of claim 6 wherein said amount is in the range of 3 to 10 pounds per barrel of said mud.

9. The method of claim 6 wherein said amount is in the range of 1 to 15 pounds per barrel of said mud.

10. The method of claim 9 wherein said drilling mud is a fresh water mud.

References Cited

UNITED STATES PATENTS

| | | | |
|---|---|---|---|
| 2,589,949 | 3/1952 | Meadors | 252—8.5 |
| 2,786,027 | 3/1957 | Salathiel | 252—8.5 |
| 2,806,001 | 9/1957 | Fong et al. | 252—89 X |
| 2,964,478 | 12/1960 | Monson | 252—331 |

HERBERT B. GUYNN, Primary Examiner